Sept. 20, 1932.  A. E. TRIPLETT  1,878,064
COOKING APPARATUS
Filed April 3, 1929  3 Sheets-Sheet 3

Inventor
A. E. Triplette
By Lacey & Lacey, Attorneys

Patented Sept. 20, 1932

1,878,064

UNITED STATES PATENT OFFICE

ARMSTEAD E. TRIPLETT, OF DALLAS, TEXAS

COOKING APPARATUS

Application filed April 3, 1929. Serial No. 352,257.

The present invention is directed to improvements in cooking apparatus, the method of cooking forming the subject matter of a divisional application filed September 12, 1929, Serial No. 392,130. The apparatus of the present invention has for its primary object to provide an apparatus of this character so constructed that food can be thoroughly cooked over a long period of time at either a high or low temperature, without the loss of any of the natural juices, the construction being such that a predetermined supply of filtered air at a predetermined flow, pressure and temperature is used to permit the release and carrying off of noxious gases and oil and, further, to permit carrying off of these objectionable elements by thorough ventilation to improve the flavor and conserve the food elements.

Another object of the invention is to provide a cooking apparatus so constructed that the food can be cooked at a low temperature, thereby preventing the destruction of valuable vitamins.

Another object of the invention is to provide an apparatus of this type wherein cured hams and meats of various kinds can be cooked under thorough ventilation and pressure and the noxious volatile bodies generated during the cooking process are released and absorbed to prevent the food having a strong flavor. It is well known that foods throw off carbon dioxide, hydrogen sulphide and other volatile sulphur compounds, and it is another object of the invention to release these compounds and eliminate the same by thorough ventilation and absorption, means being provided for the use of heated air flowing under pressure to provide the necessary oxygen for their release.

Another object of the invention is to provide an apparatus of this character in which hams and other meats and foods are cooked at a predetermined temperature and at a predetermined pressure of hot filtered air at a predetermined flow, the pressure being released from time to time by an automatically regulated pop or relief valve.

Another object of the invention is to provide an apparatus wherein meats may be brought to a searing temperature at atmospheric pressure until the meats are seared and the surface juices coagulated and at which time the temperature can be dropped and predetermined air pressure admitted and the boiling arrested so that the cooking process can be completed under thorough ventilation and pressure with little loss of valuable juices, mineral salts and vitamins.

Another object is to provide an apparatus of this nature wherein beef may be barbecued by bringing it to a searing temperature at atmospheric pressure and seasoning with smoke from hickory wood or from other suitable wood under thorough ventilation and pressure by use of flowing preheated air.

Another object is to provide an apparatus so constructed that it may be used as an open-air, fireless, or pressure cooker, the construction being such that various modes may be employed for the proper cooking of food, and while the device is primarily designed for cooking hams and other meats it is not necessarily limited to such use since other foods can be cooked therein with equal success.

With these and other objects in view, the invention resides in the novel features of construction, formation, combination and arrangement of parts to be hereinafter more fully described, claimed and illustrated in the accompanying drawings, in which:

Figure 5 is a detail sectional view showing the application of the plug.

Figure 6 is a sectional view on the line 6—6 of Figure 2.

Figure 1:
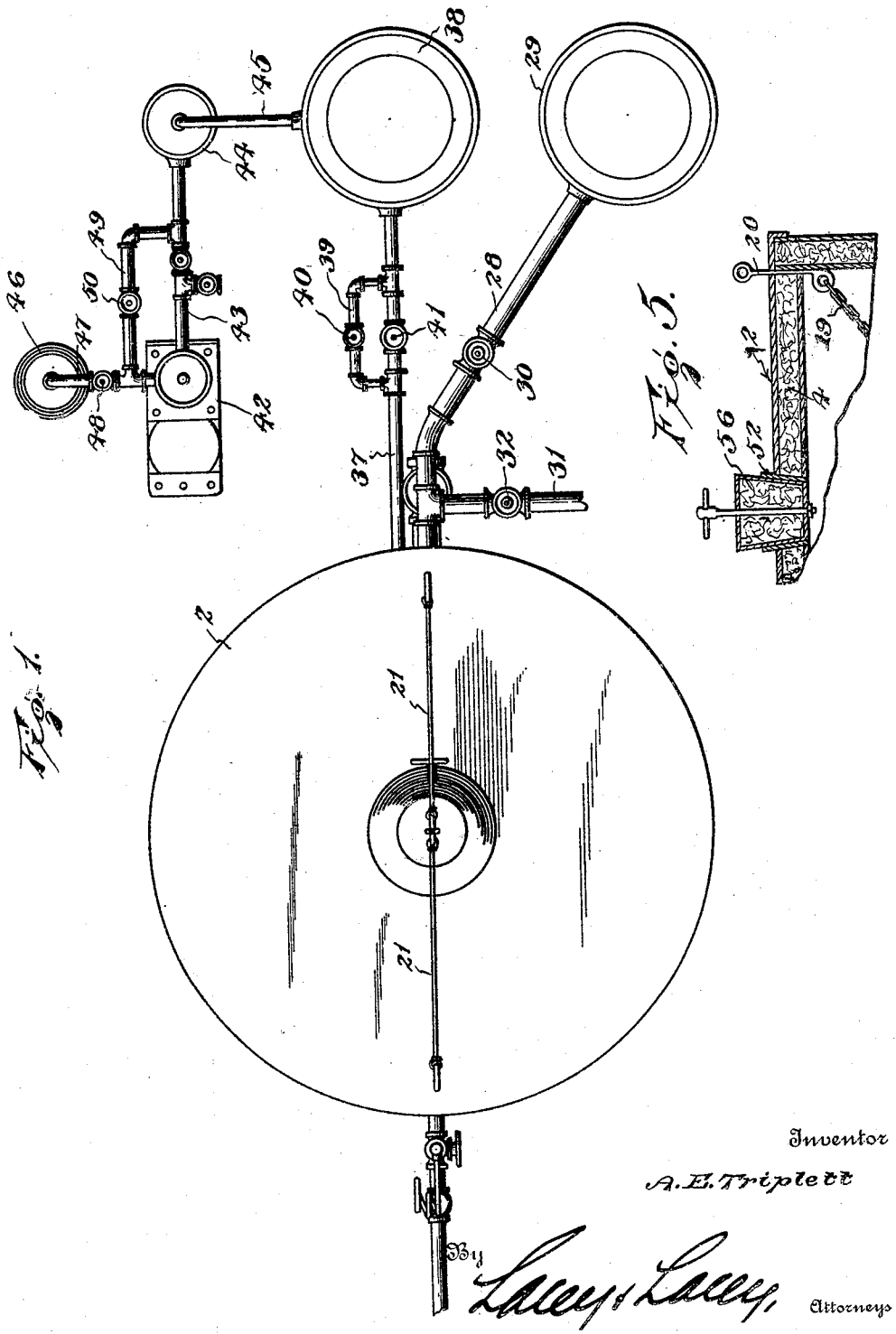
Figure 1 is a top plan view.

Referring to the drawings, A designates a casing which consists of a base section 1, top section 2, and an intermediate section 3, all of which are of sheet steel, double wall construction in order that mineral wool or other suitable insulating material 4 may be used. By forming the casing in sections the same can be conveniently assembled or disassembled. The base section has mounted therein upper and lower grates 5 and 6 respectively. Mounted upon the grate 6 are blocks 7 of soapstone or other heat retaining material and upon which rests an insulating member 8 of any suitable design which serves to diffuse the heat and prevent concentration thereof upon the bottom of the vessel to be hereinafter described.

Mounted below the grate 6 is a gas burner 9 which rests upon a plate 10 and in which are formed perforations 11 in order that air from the nozzle 12 will pass therethrough to promote proper combustion. The nozzle is supported in a plate 13 spaced from the plate 10. Air entering the space 13' below the plate 10 will be uniformly distributed through the perforations 11.

Mounted in the casing A is a vessel 14 which constitutes the oven proper of the apparatus. An annular skirt 15 depends from the bottom of the vessel and rests upon the base 5, said skirt having perforations 15' formed therein to permit the heat generated by the burner to reach the bottom of the vessel and this skirt may form an integral part of the vessel or may be formed separate therefrom, as desired.

The vessel is provided with a removable cover 16 which is held in a closed position by clamping members 17 of conventional form. The cover has an eye bolt 18 fixed thereto to which are secured one of the terminals of the chain sections 19, the other terminals thereof being secured to the shanks 20 carried by the top section 2. Cable sections 21 are secured to the shanks 20 at one of their ends and at their other ends to a ring 22 to which ring is secured a cable 22' which is secured to a counterbalance (not shown) in order that the top section 2 may be conveniently lifted when it is desired to remove the cover 16. The chain sections 19 are of such length that the cover 16 will be suspended below the top section 2 when it is elevated in order that the cover can be removed or replaced when the top section is elevated.

Figure 2:
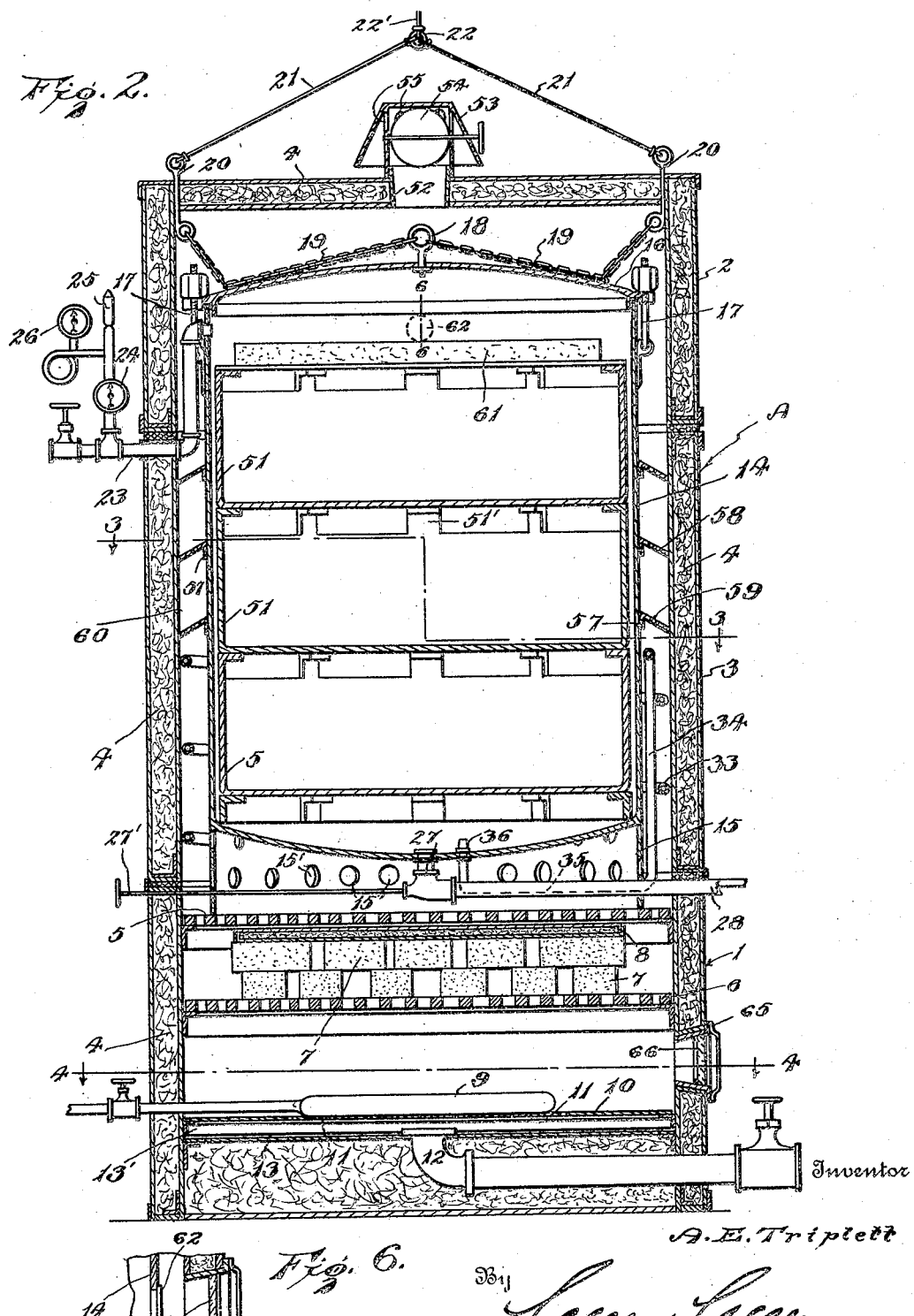
Figure 2 is a vertical sectional view.
Figure 3:
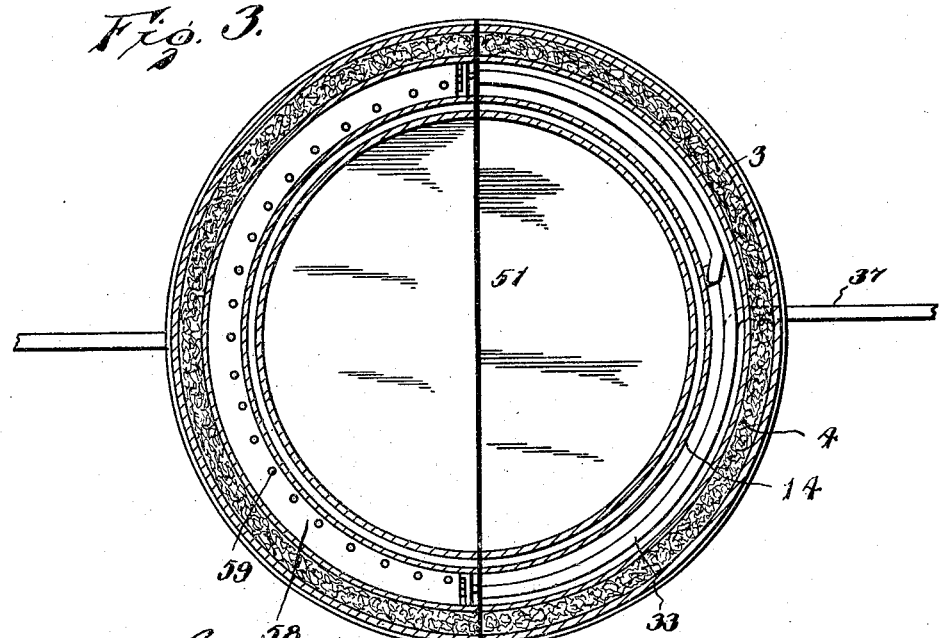
Figure 3 is a sectional view on the line 3—3 of Figure 2.
Figure 4:
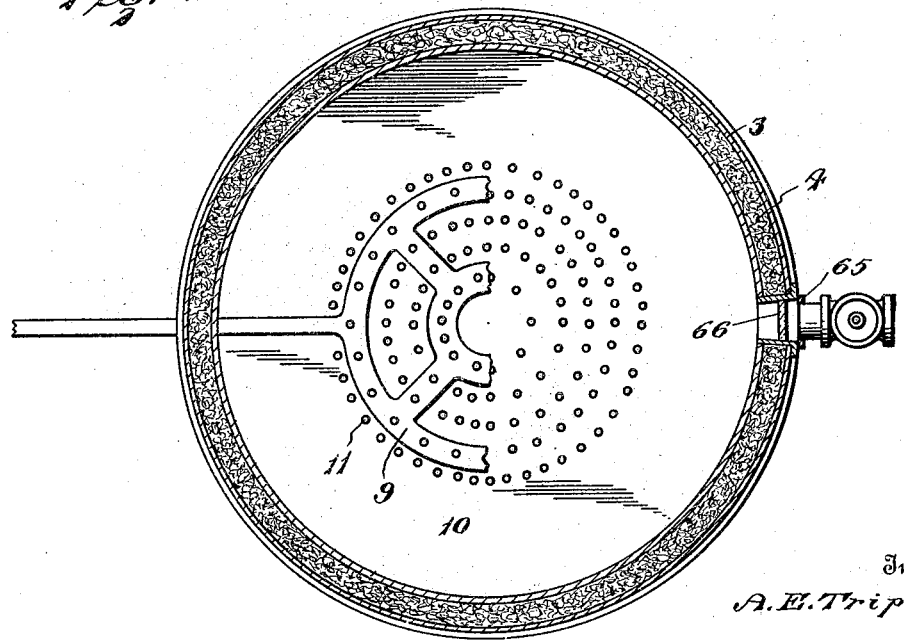
Figure 4 is a sectional view on the line 4—4 of Figure 2.

Leading from the vessel 14 is a pipe assembly 23 having associated therewith a temperature gauge 24, pop or flow valve 25, and pressure gauge 26. The valve 25 will automatically regulate the flow and pressure of the heated air and gases from the vessel. A manually controlled valve 26' is connected in the assembly 23 and operates in connection with the valve 25 to regulate the degree of ventilation. The pipe assembly opens into the upper end of the vessel, as more clearly shown in Figure 2 of the drawings.

A valve 27 opens into the bottom of the vessel 14, hot water being furnished thereto through a pipe 28 which leads from a hot water storage tank 29, said pipe being provided with a regulating valve 30 and a drain pipe 31 equipped with a valve 32. Encircling the vessel is a pipe coil 33, to preheat the air before entering the vessel the uppermost helix thereof terminating in a vertical branch 34 which, in turn, terminates in a horizontal branch 35, the terminal of which opens into the vessel at its bottom and is provided with a check valve 36.

The lowermost helix of the pipe coil terminates in a pipe 37 which extends through the base section 1 and leads to a compressed air storage tank 38, there being a bypass pipe 39 connected to the pipe 37 and having a valve 40 associated therewith. The pipe 37 is provided with a valve 41 which is located between the branches of the bypass pipe.

An air compressor 42 of suitable design is employed and has leading therefrom a pipe 43 which communicates with an air filter 44 of suitable construction, said filter being connected to the tank 38 by a pipe 45.

A smudge pot 46 is connected to the compressor 42 by a pipe 47 having a valve 48 and connecting the pipe 47 and pipe 43 is a vacuum bypass pipe 49 having a valve 50 therein. Hickory wood or other suitable wood is burned in this pot and the smoke thereof can be controlled at will. This smoke is conducted to the filter 44 and from thence, with the compressed air, into the vessel 14.

The vessel 14 has mounted therein a plurality of superposed food containing pans 51 which may be racked as shown so that they may be subjected to the action of the oven. The vessels are provided with members 51' in order that they will be maintained in spaced relation.

The top section 2 is provided with a centrally located thimble 52 which opens into the casing and removably connected with said thimble is a cowl 53 in which is mounted a damper plate 54, said cowl having openings 55 therein to permit the escape of heat from the casing when desired.

Since the cowl is removable, a plug 56 can be placed in the thimble, as shown in Figure 5 of the drawings, in order to retain the heat in the casing when the gas flame is extinguished.

A plurality of vertically spaced split bands 57 are clamped around the vessel 14 above the coil 33 and have carried thereby baffle flanges 58 in which are formed perforations 59. These baffle flanges are of such size that the outer ends thereof will bear against the interior wall of the section 3 and will obviously retard the passage of heat in the annular space 60 defined between the casing and vessel. Removably mounted upon the uppermost pan 51 is a pad 61 formed of absorbent material, preferably consisting of burnt fire clay and cement, and is employed for absorbing injurious volatile oils thrown off during the cooking process. The vessel 14 is provided with a temperature gage 62 at its upper end which coincides with a lens 63 carried by the frame 64 removably mounted in the section 2. A similar frame 65 is removably mounted in the base section 1 and carries a lens 66 in order that the condition of the burner flame can be observed. Obviously, upon removing both the frames 64 and 65, the apparatus can be more quickly cooled after the flame is extinguished when the cooking operation is finished. A thermostat of standard design may be used for regulating the flow of gas to the burner.

Obviously, the apparatus can be used for boiling food upon admitting hot water to the vessel through the pipe 28 and subjecting the water to the heat of the burner 9, and air can be admitted through the valve 36. When it is desired to cook cured meats, such as hams, the same are placed in the pans 51 and may be saturated with or contained in proper seasoning fluid. The air flowing into the coil 35 will be heated and then flows into the vessel 14 in measured quantities at a predetermined pressure, thence out through the valve 25, taking with it all the impurities released by the heat and oxygen, and when desired, smoke is mixed with the air as it flows into the filter through the pipe 49. The mixture of smoke and air can be conveniently controlled by the valves 40 and 41 and 25.

When it is desired to use the apparatus as a pressure cooker the proper amount of water is admitted to the vessel 14 and the temperature brought to the proper point, whereupon the flame is automatically extinguished by a thermostat and the cowl 53 removed and the plug 56 placed in the thimble 52, thus retaining the heat of the apparatus, and since the blocks 7 are thoroughly heated, the cooking process can be continued.

When it is desired to cool the apparatus quickly, the frames 64 and 65 and the plug 56 are removed in order that a draft will be created through the apparatus.

The pop valve 25 will obviously operate when the pressure reaches a predetermined degree.

It will, of course, be understood that the casing 1 has its wall formed from suitable sheet metal in order that the insulating material can be conveniently packed therein.

The valve 27 has an actuating rod 27' connected therewith and upon closing this valve hot water can be used for flushing juices from the pipe 28. When this is done the valve 32 is opened to permit discharge of the flush water through the pipe 31. Obviously, the valve 50 in the vacuum by-pass 49 can be opened to draw air from the vessel so that juices can be boiled out of the meat quickly. The valves are then closed so that the juices are cooked under flowing filtered air and pressure at a predetermined heat. In this manner beef extract can be processed.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What is claimed is:

1. An apparatus of the class described comprising a casing, a removable top section for the casing, a vessel mounted in the casing, a cover for the vessel, means for heating the vessel, and single means for raising the top section and vessel cover.

2. An apparatus of the class described comprising a casing including a top section, a vessel mounted in the casing, a burner for heating the vessel, a thimble carried by the top section, a cowl connected with the thimble and having a damper therein for controlling discharge of products of combustion from the casing, said cowl being removable to permit the insertion of a closing plug in the thimble.

3. An apparatus of the class described including a closed food containing vessel, a casing confining the vessel, a burner for heating the vessel, a thimble carried by the top of the casing, a cowl connected with the thimble and having a damper therein for controlling discharge of products of combustion from the casing, said cowl being removable to permit the insertion of a closing plug in the thimble.

4. An apparatus of the class described comprising a casing, a burner therein, a closed air tight cooking vessel in said casing adapted to be heated by said burner, trays racked one above the other in said vessel, a compressed air supply pipe encircling the vessel and adapted to be heated by said burner, said pipe discharging upwardly through the bottom of said vessel, a check valve in said pipe, a valve controlled pipe for admitting air under pressure to said supply pipe, an outlet pipe communicating with said vessel near the top thereof, and a flow valve in said outlet pipe normally open to permit the continuous escape of air and noxious gases from the vessel during the cooking period.

5. An apparatus of the class described comprising a closed casing, said casing having insulated walls, a closed cooking vessel therein sealed air tight and annularly spaced from the walls of said casing, a burner in said casing below said vessel, baffles between said casing and said vessel for deflecting the heat against the exterior of said vessel whereby the cooking is accomplished by heat radiated from the walls of said vessel, a compressed air supply pipe encircling said vessel and adapted to be heated by said burner, said pipe discharging into said vessel, a valve controlled inlet pipe for supplying air under pressure to said supply pipe, an outlet pipe connected with said cooking vessel, a flow valve in said outlet pipe permitting the escape of air and noxious gases continuously during the cooking period from said vessel, and a pop valve for releasing excess pressure from said vessel.

6. In a baking apparatus, a combustion chamber, a heating chamber overlying and insulated from the combustion chamber, an oven over the heating chamber, an air pipe in the heating chamber underlying the oven and having a discharge leading into the oven, means to supply air under pressure to the pipe, and means to supply heat to the combustion chamber.

In testimony whereof I affix my signature.

ARMSTEAD E. TRIPLETT. [L. S.]